UNITED STATES PATENT OFFICE.

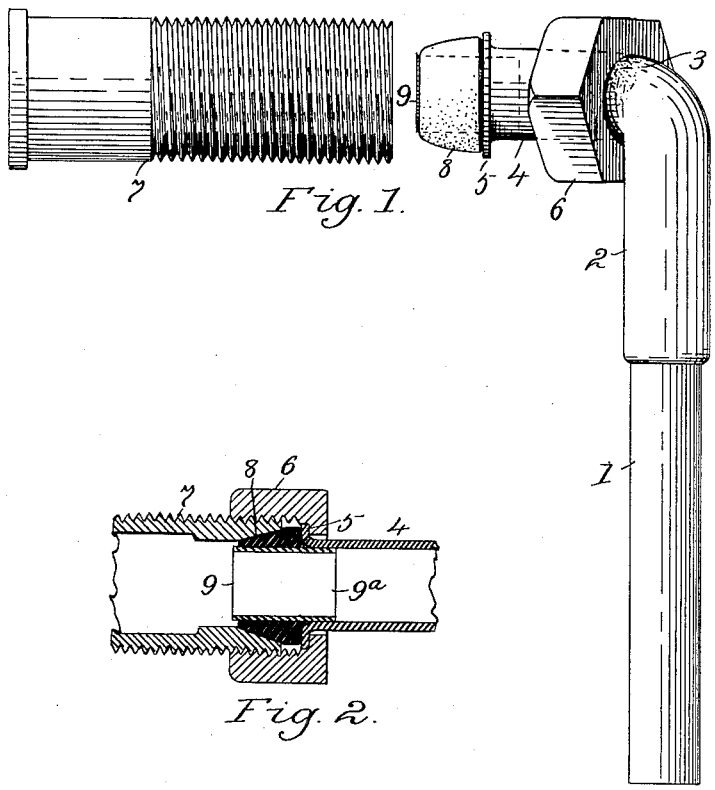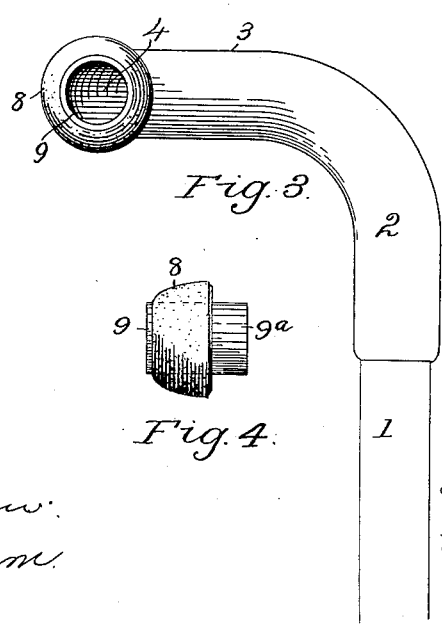

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

PIPE CONNECTION.

931,950.  Specification of Letters Patent.  Patented Aug. 24, 1909.

Application filed June 19, 1906, Serial No. 322,488. Renewed September 5, 1908. Serial No. 451,856.

*To all whom it may concern:*

Be it known that I, HENRY MUELLER, a resident of the city of Decatur, county of Macon, and State of Illinois, have invented certain new and useful Improvements in Pipe Connections, of which the following is a specification.

This invention relates to water distribution, and more especially to detachable pipe couplings; and its object is to produce a pipe connection whereby the gasket between the connected members will be compressed both longitudinally and toward the axis in the act of making the coupling, but neither member nor the compressible portion of the gasket will be unduly distorted.

One embodiment of this idea is illustrated in the accompanying drawings and set forth in the following specification, both detailing its use as between an elbow and the stem or shank of a cock although it will be clear that other tubular members could be coupled by my pipe connection.

In said drawings, Figure 1 is an elevation of the elbow and stem slightly separated from each other, and of all parts of this pipe coupling as they appear immediately before the connection is made; Fig. 2 is a section through the complete coupling after the connection is made; Fig. 3 is an elevation of the end of the elbow with the gasket in place; and Fig. 4 is a detail in side elevation showing the joint-ring and sustaining ring which comprise that form of the gasket preferably employed in this connection.

As shown in the drawings, the elbow member comprises a pipe section 1, and an elbow proper having one extremity 2 conjoined with or secured around the pipe section 1, a bend 3 in its body, and a joint-forming end 4 which is flat on its extremity where it is preferably provided with an exterior flange 5; and in the commercial manufacture of this elbow it may be of rather thin material. The stem 7 (which may be the shank of a cock, not shown) is illustrated in the drawings as having its extremity threaded externally and flared internally, and it will be clear that the pitch and length of the flaring portion may be varied within reasonable limits from what are shown. Exterior means are provided for approximating the coupling members, and when constructed as above described and as shown in the drawings I will employ a coupling nut 6 having internal threads to engage those upon the stem and at one end an internal shoulder to engage the flange 5 on the elbow.

With the members to be coupled I employ a gasket of which one form is illustrated in Fig. 4 and is elsewhere shown in the drawings. By preference it consists of a joint-ring 8 of lead or some other easily compressible metal, having a cylindrical bore through which extends a sustaining ring 9 of brass or other stiff and thin metal sufficiently strong to withstand inward pressure which might crush it and sufficiently long to provide an extension 9$^a$ that projects beyond one end of the joint-ring as shown. The latter may have its exterior tapered, and by preference it is made conical as shown or otherwise shaped so that in assembling the parts it will enter the flared extremity of the stem 7 and its larger or flattened end will rest against the member 4 or against its flange 5 if the coupling means be such as to require a flange. The external diameter of the extension 9$^a$ preferably conforms with the internal diameter of the member having a cylindrical bore, which is the elbow 4 as shown in Fig. 2; and when said extension is manually inserted therein the entire gasket is held frictionally in place preparatory to making a connection as shown in the drawings. The elbow is larger in internal diameter than the pipe section 1, as also is the sustaining ring 9, and hence the capacity of said pipe section is not restricted by the use of this gasket.

In making a connection, the gasket is put in place by manually inserting the extension 9$^a$ into the elbow as shown, and the hands of the operator are then left free to bring the stem 7 and coupling nut 6 into position and properly manipulate the parts— thus lessening the liability of dropping the gasket during the operation. As the members are approximated, the flaring extremity of the stem engages the exterior of the joint ring 8, and whatever the shape of the latter it will be compressed inward around and upon the sustaining ring 9 by reason of such flare and will also be compressed longitudinally against the end of the elbow member 4 or its flange 5 if one be there employed. Meanwhile the sustaining ring serves the purpose of withstanding this pressure and resisting collapse of the joint-ring, and its extension also holds the joint-ring alined with the elbow and strengthens the latter if it be of thin material. As the members approach each other the soft joint ring will be distorted somewhat from its original exterior shape, although its interior will remain cylindrical by reason of its close fit around the sustaining ring, and the latter may be moved or slid slightly into the bore of that member which its extension frictionally engages as above described. Finally the parts assume the position shown in Fig. 2, from which it will be seen that the compression of the joint-ring has been radially inward and also longitudinal; but if it were soft enough and the approximation of the members were sufficiently powerful, it is clear that such portion of the joint-ring as did not enter the flaring extremity of the stem might be distended outward within the coupling, although I do not consider this an objectionable feature. Ordinarily, however, the parts come to rest in about the relative position shown in Fig. 2; and it will be seen that this connection increases the facility of manipulation, is adapted for use with stems of different bores or flares and with elbows or equivalent members with or without the flange, and may be employed with coupling means other than as herein specifically shown and described. It is important to note, also, that while the exterior of the joint ring is preferably tapered or conical, it is not necessarily so when the extremity of one of the coupling members is flared, because it is the flare and the sustaining ring which produce the inward compression of the joint ring if any part of the latter be small enough to enter the flared extremity.

The gist of the present invention was included in an application bearing Serial Number 322488, filed by me June 19, 1906, of which the present application is a renewal; in another application filed contemporaneously with the present one and bearing Serial Number 451,544 I illustrate and describe variations in the forms of the several parts of this pipe connection whereby the compression of the joint-ring is longitudinal, or longitudinally and radially outward instead of inward; and in yet another application filed September 10, 1908, and bearing Serial Number 452,448 I illustrate and describe variations in the form and structure of a gasket embodying these general ideas but adapted for use with pipe sections or members having meeting extremities of a variety of shapes and sizes, whereby each gasket is intended to fit them all.

What is claimed as new is:

1. A connection for hard metal pipes comprising a member flared internally at its extremity, a second member having a flat extremity, external means for approximating said extremities, a yielding joint-ring interposed between them and shaped to enter the flared extremity and abut against the other, and a stiff sustaining ring located within the joint ring and having an extension beyond one end thereof fitting slidably within the bore of one of said members.

2. A connection for hard metal pipes comprising a member flared internally at its extremity, a second member internally cylindric at its extremity, an exterior coupling for approximating said members, a yielding joint-ring interposed between said members and shaped to enter the first and abut against the end of the second, and a stiff sustaining ring within the joint-ring and extending beyond one end thereof with its projecting end adapted to be manually inserted and frictionally held in the member having a cylindric extremity.

3. A connection for hard metal pipes comprising an externally threaded member internally flared at its connecting end, a second member having an exterior right-angular flange at its extremity, a coupling nut having threads to fit those on the first-mentioned member and an internal right-angular shoulder swiveled on the second member behind its flange, a yielding joint-ring having one end adapted to rest against said flange and a tapered exterior adapted to fit said flaring end, and a stiff sustaining ring fitting within the joint-ring and extending from a point substantially flush with its smaller end, through its body and beyond its larger end, and fitting slidably within the bore of said flanged member.

4. In a pipe connection, the combination with a pipe section, an elbow having one extremity secured rigidly around the end of the pipe section, and a stem internally flared at its extremity; of an exterior coupling for approximating the connecting ends of the elbow and stem, a yielding conical joint-ring having its larger end resting against the extremity of the elbow and its tapered body engaging the flaring portion of the stem, and a stiff sustaining ring fitting within the joint-ring and extending beyond it into said elbow, the bore of this ring being larger than that of said pipe section.

In testimony whereof I sign my name in the presence of two subscribing witnesses.

HENRY MUELLER.

Witnesses:
 FRANK W. CRUIKSHANK,
 JOHN L. WADDELL.